April 19, 1938.  C. CONNER  2,114,703
TOOL FOR CONDITIONING AND APPLYING PLASTIC BONDING MATERIALS
Filed March 3, 1937
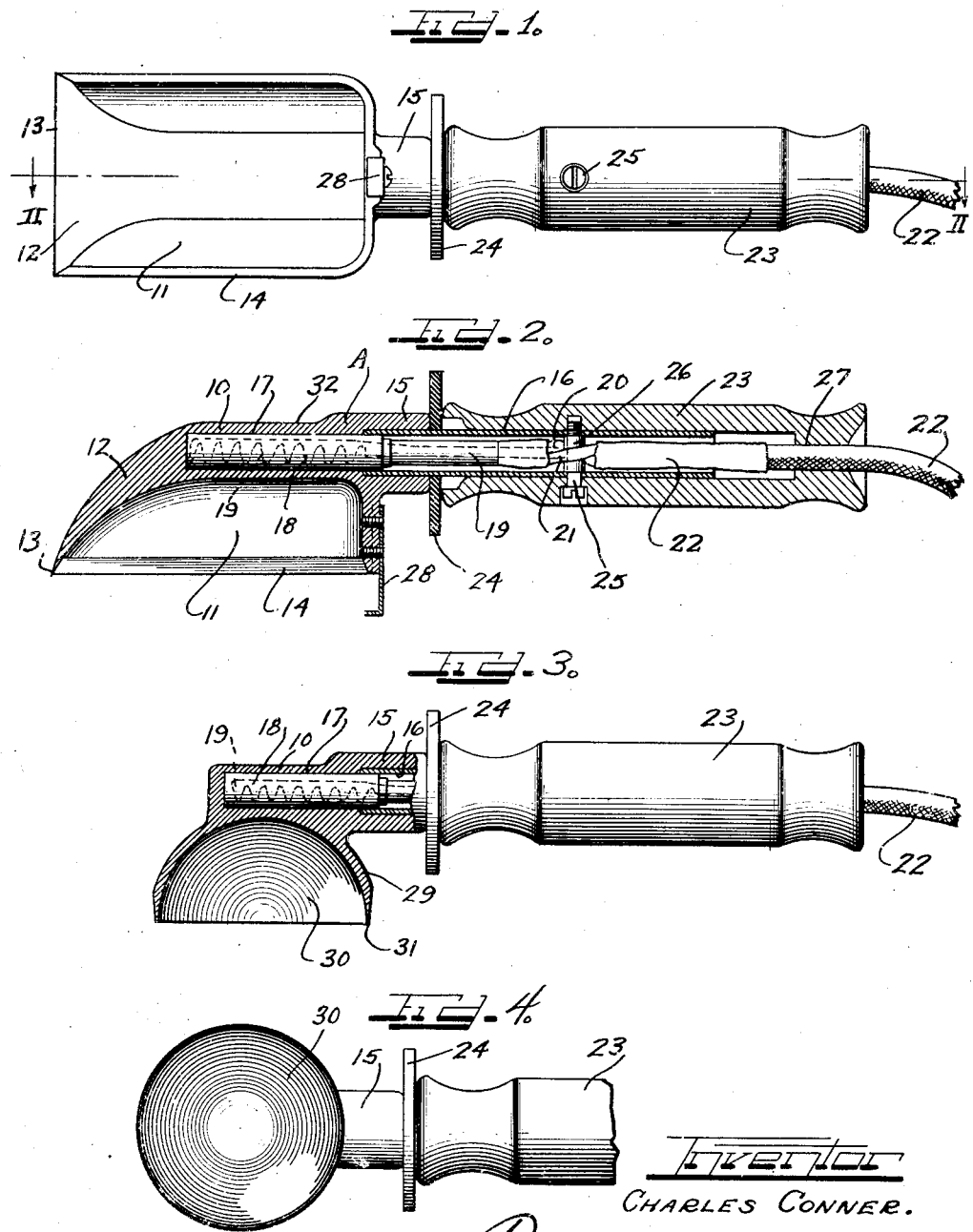
Inventor
CHARLES CONNER.

Patented Apr. 19, 1938

2,114,703

UNITED STATES PATENT OFFICE 2,114,703

TOOL FOR CONDITIONING AND APPLYING PLASTIC BONDING MATERIALS

Charles Conner, Chicago, Ill.

Application March 3, 1937, Serial No. 128,741

3 Claims. (Cl. 219—21)

My invention relates to an improved tool for heat conditioning and applying plastic bonding material for bonding or cementing structural parts together or to supports.

Certain bonding plastics or mastics change in their consistency with change in temperature. For example, plastics or mastics comprising a bituminous or hydrocarbon base and solvents, thicken or set with decreased temperatures and require to be heated to change their consistency to meet the conditions under which they are to be used in order to give the most effective and efficient bonding or cementing service. The bonding material is usually shipped in containers to where it is to be used, and in this commercial state it is usually highly viscose, congealed, or solidified, and must be heated to a proper service temperature. The important object of my invention is therefore to provide a tool heated preferably electrically and shaped so that it may be used as a scoop for scooping a desired amount of the material from the container and then heating it to proper condition before application therefrom of the heated contents to structural parts which are to be bonded or cemented together. The hot tool readily melts its way into the highly viscous or solidified material in the container for gathering a charge of material, and then, by further heating while in the tool, the material consistency is changed, the solvent or volatile ingredients of the material nearest the heating surface of the tool being rapidly dissipated to a point where, when the tool contents is applied between surfaces of structural parts to be bonded together, the material, at its outer surface, will be in its most efficient adhesive state and will quickly set or dry so as to hold the structural parts firmly bonded or cemented together in proper relative position or alignment.

The material container part of my improved tool may be scoop shaped, ladle or cup shaped, or of any other suitable shape depending upon the nature of the work in connection with which the tool is to be used, and the invention also involves an improvement in the mechanical and electrical construction and arrangement of the tool which will enable it to be efficiently used.

My improved tool is disclosed on the accompanying drawing, in which drawing:

Figure 1 is a plan view of the tool;

Figure 2 is a sectional view on line II—II of Figure 1;

Figure 3 is a side elevation of a tool with a modified form of container part in cross section; and Figure 4 is a plan view of the tool of Figure 3.

In the structure of Figures 1 and 2 the container portion A of the tool is of suitable heat conductive material as for example copper or bronze, the bottom portion 10 of the container below the material containing cavity 11 being comparatively thick so as to provide sufficient metal for holding and retaining heat. As shown in Figures 1 and 2 the container element may be of oblong or scoop shape, the front portion of the bottom curving and converging gradually into a pointed edge 13 which is in alignment with the edges 14 of the side wall portion of the container.

The container has a neck 15 extending rearwardly from its bottom for receiving and securing a handle shank 16 preferably in the form of a metal tube. Within the bottom 10 of the container is the bore 17 in axial alignment with the handle tube 16 and this bore receives the tubular container or housing 18 for an electrical heating element 19 in the form of a heating coil. The housing 18 is of such diameter that it may be passed through the handle tube for insertion in or removal from the bore 17. The heating coil housing 18 may have the extension 19 thereon within the handle tube 16 for receiving and protecting the terminals of the heating coil and their connection with electrical circuit conductors 20 and 21 which conductors are themselves insulated and further insulated by the cord 22. The outer end of the handle tube 16 receives a grip structure 23 which is preferably of heat insulating material such as wood, and preferably a washer 24 of heat insulating material is applied to the handle tube to be clamped between the end of the container part and the grip structure when the parts are assembled, this washer shielding the hand from the heat at the container element.

To secure the parts together a single screw 25 may be utilized, this screw extending diametrally through the grip structure and the handle tube 16 and between the electrical conductors 20 and 21, a sleeve 26 of insulating material being preferably applied within the tube 16 to assure insulation of the screw from the conductors. At its outer end the grip structure has the passageway 27 for the cord 22 which at its outer end terminates in a suitable plug for connection with an electrical circuit outlet. Upon removal of the screw 25, the grip structure and the washer may be slid from the handle tube 16, and then the heating element assembly may be pulled out through the handle tube in case repairs or replacements are necessary. A member 28 in the form of a hook or bracket may be secured to the container element as shown for hanging or setting the tool on a suitable support when it is not in use.

The structure shown in Figures 3 and 4 may be exactly like that of Figures 1 and 2 except that the container bowl 29 has a different shape cavity, the cavity 30 shown being semi-spherical, the bowl edges 31 being sharp.

My improved tool is designed and intended for use particularly in connection with plastic bonding materials which come in more or less congealed or solidified consistency in commercial containers, and must first have their consistency changed by suitable heating thereof before application to the structural parts to be bonded or united. When the tool is to be used, the electric current is turned on for heating of the container element by the heating coil and after the container has been heated it may readily melt its way into the mass within the container for receiving a charge of material in its cavity, the sharp edges of the tool facilitating its passage into the mass in the container. After a charge of material has been scooped out of the container by the tool it is held in the tool a sufficient length of time for heating of the charge to the proper plastic consistency before application to the surfaces to be bonded. For example, where the bonding material comprises a hydrocarbon or bituminous base and volatile solvents, the heating of a charge within the tool will cause evaporation or dissipation of some of these solvents, particularly along the outer layer of the charge where it is in contact with the hot bottom and sides of the tool container, so that when the charge is deposited from the tool between surfaces to be bonded the contact portions of the material will quickly dry or set after firm adhesion with the surfaces of the structures to be bonded together so that the structures will be firmly united and held against relative displacement. The heating of the outer layer of the material where it engages the hot bottom and sides of the tool container element will soften and liquidate the material of such layers so that the entire mass may be readily discharged from the container without any of it sticking thereto.

The tool shown in Figures 1 and 2 may have its rear face 32 flattened, and with this flat back and the outer preferably polished surface of the end portion 12 of the container, the tool may be used for working a discharged mass to desired form and position for the bonding service required.

The tool with the form of container shown in Figures 3 and 4 is adapted particularly for use where the contents of the tool, after having been properly heated, are thrown from the tool against surfaces to which structural parts are to be bonded.

I thus produce a tool which is particularly useful for the conditioning and application of plastic materials for bonding or cementing structural parts together, and for heating the material for proper conditioning thereof before application. The structure shown can be readily assembled, or taken apart for replacement or repair.

I claim as follows:

1. A tool for use in structural work for conditioning and applying plastic or mastic materials for bonding or cementing structural parts together or to supports, said tool comprising a metallic body shaped to define a plastic material receiving portion having defining sides integrally formed with a relatively thick bottom which is provided with an integrally formed handle extension extending substantially beyond the defining sides of the material receiving portion, said bottom having a longitudinal bore housing a heating element therein, and said extension having a bore in alignment with said first-named bore receiving a tube entered therein and extending outwardly therefrom, and a hand grip of heat insulating material on said tube and in abutting relation with the free end of said extension.

2. A tool for use in structural work for conditioning and applying plastic or mastic materials for bonding or cementing structural parts together or to supports, said tool comprising a metallic body shaped to define a plastic material receiving portion having defining sides integrally formed with a relatively thick bottom which is provided with an integrally formed handle extension extending substantially beyond the defining sides of the material receiving portion, a heating element removably placed in a longitudinal bore in said bottom, said extension having a longitudinal bore communicating with said bore in said bottom, a tube having an end entered in the bore of said extension, and a hand grip of insulating material having an end disposed immediately adjacent the free end of said handle extension, and slidable on said tube.

3. A tool for use in structural work for conditioning and applying plastic or mastic materials for bonding or cementing structural parts together or to supports, said tool comprising a metallic body shaped to define a plastic material receiving portion having defining sides integrally formed with a relatively thick bottom which is provided with an integrally formed handle extension extending a substantial distance beyond the defining sides of the material receiving portion, a heating element removably placed in a bore in said bottom, and a hand grip of insulating material secured to said extension with an end immediately adjacent the free end of said extension.

CHARLES CONNER.